Sept. 17, 1929.   O. A. YOUNGREN   1,728,465
SELF CLOSING VALVE
Filed March 28, 1928
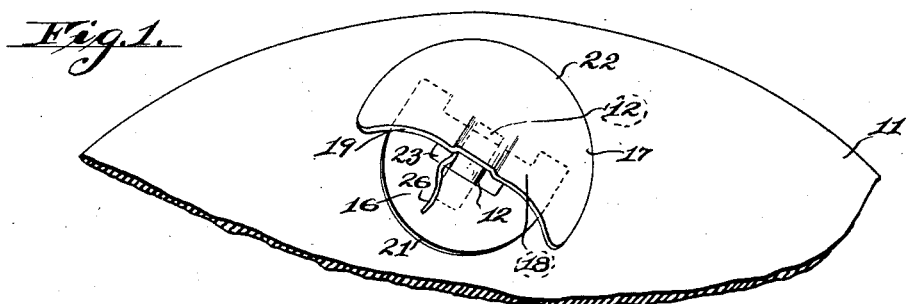
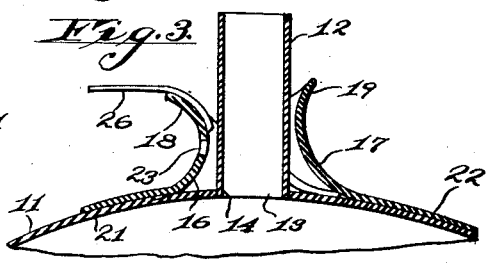
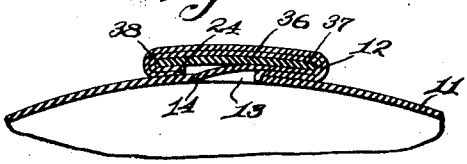
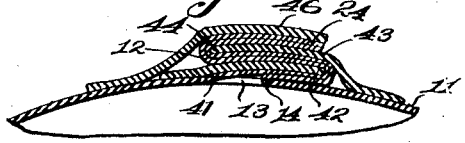
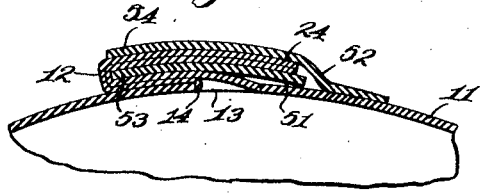
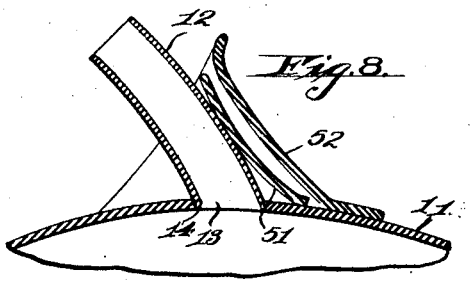
*Inventor*
O. A. Youngren
by Hazard and Miller
*Attorneys*

Patented Sept. 17, 1929

1,728,465

UNITED STATES PATENT OFFICE

OSCAR A. YOUNGREN, OF PASADENA, CALIFORNIA

SELF-CLOSING VALVE

Application filed March 28, 1928. Serial No. 265,287.

This invention relates to self-closing valves, and more especially to that type of valve employed for sealing receptacles containing fluid under pressure.

An object of the invention is the provision of an improved type of self-closing valve adapted for use with such flexible receptacles as inflatable balls, life preservers, and the like.

A more detailed object is the provision of a valve of the character described, comprising an inflating and deflating tube extending from a port in a wall of such an inflatable receptacle, and one or more strips of flexible material secured adjacent the point of attachment of the tube to the ball in such position as to extend directly over the port and collapse the tube, and to permit the interweaving and kinking of the tube about the strips to form an effective sealing means for the tube.

A further object is the provision of a sealing valve as described, in which the flexible strips are capable of not only sealing the tube, but also offering protection therefor against abrasion or other injury.

With the foregoing and other objects in view which will be made manifest in the following detailed description and specifically pointed out in the appended claims, reference is had to the accompanying drawings for an illustrative embodiment of the invention, wherein:

Figure 1 is a perspective view showing one form of my improved self-closing valve in operative position upon an inflated ball.

Fig. 2 is a transverse, sectional view of a portion of the ball and the valve, with the valve shown in sealing position.

Fig. 3 is a transverse, sectional view of the valve of Fig. 2, in inflating or deflating position.

Fig. 4 is a view similar to Fig. 2 of a modified form of valve.

Fig. 5 is a view similar to Fig. 2, of a further modification of the valve.

Fig. 6 is a view similar to Fig. 2, of still another modification of the valve.

Fig. 7 is a view similar to Fig. 2, of another modification.

Fig. 8 is a transverse, sectional view of a portion of a ball, with the valve of Fig. 7 in inflating or deflating position.

In terms of broad inclusion, my improved self-closing valve comprises a flexible inflating and deflating tube in communication with the interior of an inflatable ball or other receptacle. One or more strips of flexible material are secured to the outside of the receptacle adjacent the point at which the tube penetrates the wall, and so positioned in respect thereto that the tube may be interwoven and kinked thereabout to form an effective means of collapsing and sealing the tube against escape of the air or other fluid under pressure within the receptacle. At least one of the strips is so positioned that it extends directly across the point of attachment of the tube to the receptacle, so that when the strip is in normal position, the tube is bent at a sharp angle from the direction in which it would otherwise extend from the receptacle. The tube is then bent at substantially 180° about a free edge of the strip to so effectually collapse the tube that a positive seal is provided against the escape of fluid from the receptacle.

In greater detail, a preferred embodiment of the invention is shown as a means for sealing an inflatable ball 11 of conventional type. A flexible tube 12, preferably of rubber, is attached to the ball 11 to extend from a port 13 and establish communication with the interior of the ball 11 to permit inflation or deflation of the ball.

It is to be understood that any means for attaching the tube 12 to the ball 11 may be employed. The method herein shown and described is simply that of attaching the inner end 14 of the tube within the port 13 by ordinary rubber cement.

In the embodiment shown in Figs. 1, 2, and 3, a pair of flexible, and preferably electric strips 16 and 17 are secured to the ball 11 in such position that their free edges 18 and 19 respectively, overlap the port 13, and with the free edge 19 of the strip 17 overlapping the free edge 18 of the strip 16. Preferably, the strips 16 and 17 are semi-circular in form, and each is secured to the ball 11 throughout the length of its curved edge 21 and 22, respectively. Since the strip 17 overlaps the strip 16, its diameter is greater than that of the strip 16, as clearly shown in Fig. 1.

With the strips 16 and 17 positioned as described, the tube 12 is bent sharply to one side as it leaves the ball 11 by the lowermost strip 16. It then bends at substantially 180° sharply around the free edge 18 of the strip 16, being pressed down tightly against the top of the strip 16 by the overlapping strip 17.

It may be readily understood that when the ball 11 has been inflated to a certain degree, the pressure of the entrapped fluid will cause the flaps 16 and 17 to be stretched tightly toward the ball, with the result that the tube 12 is collapsed to effect the tight sealing thereof and prevent the escape of the fluid.

A slot 23 is provided in the lowermost strip 16, closely adjacent the free edge 19 of the strip 17. Through this slot 23, the outer end 24 of the tube may be inserted. This offers not only an additional means for collapsing the tube, but also means for protecting the otherwise exposed end 24 of the tube against abrasion, bruising, or other injury.

Since the strips 16 and 17 are composed of flexible, and preferably elastic material, the free edges 18 and 19 respectively, may be lifted from the ball 11 sufficiently to permit the tube 12 to straighten out as clearly shown in Fig. 3. This is to be effected of course after the outer end 24 of the tube 12 has been removed from the slot 23 in the lowermost strip 16. To facilitate the raising of the free edges 18 and 19, a cord 26 extends from the free edge 18 of the lowermost strip 16, whereby by pulling on the cord 26, the free edge 18 of the lowermost strip may be elevated, and with it the free edge 19 of the upper strip 17. It is obvious that when in this position, the tube 12 may straighten out to permit ready inflation or deflation of the ball 11 whenever desirable.

In the modification shown in Fig. 4, the ball 11 is supplied with a flexible tube 12 extending from a port 13 in the ball 11, in the same manner as previously described. A strip 31 is secured at one edge to the ball 11 adjacent the port 13, with the free edge 32 thereof extending over the port to bend the tube 12 sharply to one side as it leaves the ball 11. A second strip 33 is disposed over the port 13 and the strip 31, the second strip, 33, being attached to the ball 11 at its ends 34 only. The outermost strip 33 is pierced with an aperture 35 through which the outer end 29 of the tube 12 is accessible. The tube 12 is bent sharply around the free edge 32 of the lowermost strip 31, and back between the strips 31 and 33. Thus when the ball 11 is inflated, the strip 31 will be sufficiently tensioned to press part of the tube 12 tightly against the ball 11; and the strip 33 will be sufficiently tensioned to press the remainder of the tube 12 against the top of the strip 31. The strips 31 and 33 are possessed of enough elasticity to permit their being elevated sufficiently to release the tube, the outer end 24 of which may then be drawn out through the aperture 35 for the purpose of inflation or deflation.

In Fig. 5 a further modification is shown, wherein a single strip 36 is employed. The strip 36 is secured at its ends only, to the ball 11, with the center portion of the strip 36 extending over the port 13 so that the tube 12 is bent sharply to one side as it leaves the ball 11. With this modification, the tube 12 may be bent sharply around that free edge 37 of the strip 36 toward which it is bent as it leaves the ball, to extend across the top of the strip 36 to have its outer end 24 inserted under the free edge 38 of the strip 36.

Fig. 6 shows another modification wherein the tube 12 is first bent sharply to one side as it leaves the ball 11 by a lowermost strip 41. It is then bent sharply around the free edge 42 of the lowermost strip 41 by another strip 43 overlapping the lowermost strip 41 from the other side of the port 13. The outer end 24 of the tube 12 is then again bent sharply around the free edge 44 of the strip 43 by a third strip 46 which overlaps both strips 41 and 43 from the same side as the lowermost strip 41.

Figs. 7 and 8 show a still further modification in which two strips 51 and 52 overlap the port 13 from the same side. The tube 12 is bent sharply as it leaves the ball 11 toward the free edges 53 and 54 respectively, of the strips, and is bent sharply around the free edge 53 of the lowermost strip 51 with the outer end 24 of the tube 12 inserted between the two strips.

Fig. 8 shows the manner in which the strip of the last mentioned modification may be raised to permit the tube 12 to straighten out for the purpose of inflation or deflation.

Various changes in the details of construction may be made without departing from the spirit and scope of the invention as defined by the appended claims.

I claim:

1. In combination with an inflatable receptacle provided with a port, a self-closing valve comprising a tube leading from said port, and a pair of strips secured to the receptacle and extending over the port, a portion of said tube being releasably collapsed between the innermost of said strips and the receptacle, and said tube having a reverse bend therein to removably dispose another portion of the tube between said strips.

2. In combination with an inflatable receptacle provided with a port, a self-closing valve comprising a tube leading from said port, and a plurality of strips secured to the receptacle and extending over the port, a portion of said tube being releasably collapsed between said strips.

3. In combination with an inflatable receptacle provided with a port, a self-closing valve comprising a tube leading from said port, and a plurality of elastic strips secured to the receptacle and extending over the port, a portion of said tube being releasably collapsed between said strips.

4. In combination with an inflatable receptacle provided with a port, a self-closing valve comprising a flexible tube leading from said port, a strip secured to said receptacle and overlapping said port from one side thereof, and a second strip secured to the receptacle and overlapping the port and first mentioned strip from the opposite side of the port, a portion of said tube being releasably collapsed between said strips.

5. In combination with an inflatable receptacle provided with a port, a self-closing valve comprising a flexible tube leading from said port, an elastic strip secured to said receptacle and overlapping said port from one side thereof, and a second elastic strip secured to the receptacle and overlapping the port and first mentioned elastic strip from the opposite side of the port, a portion of said tube being releasably collapsed between said strips.

6. In combination with an inflatable receptacle provided with a port, a self-closing valve comprising a flexible tube leading from said port, an elastic strip secured to said receptacle and overlapping said port from one side thereof, and a second elastic strip secured to the receptacle and overlapping the port and first mentioned strip from the opposite side of the port, said tube being bent in a sharp angle around the overlapped edge of said first mentioned strip when the strips are in normal position.

7. In combination with an inflatable receptacle provided with a port, a self-closing valve comprising a flexible tube leading from said port, an elastic strip secured to said receptacle and overlapping said port from one side thereof, and a second elastic strip secured to the receptacle and overlapping the port and first mentioned strip from the opposite side of the port, said tube being bent in a sharp angle around the overlapped edge of said first mentioned strip when the strips are in normal position, and said first mentioned strip being provided with a slot through which the outer end of the tube is adapted to be inserted.

8. In combination with an inflatable receptacle provided with a port, a self-closing valve comprising a flexible tube leading from said port, a strip secured to said receptacle and overlapping said port from one side thereof, a second strip secured to the receptacle and overlapping the port and first mentioned strip from the opposite side of the port, and a cord secured adjacent the free edge of the innermost strip whereby the free edges of both strips may be raised to release the tube.

9. In combination with an inflatable receptacle provided with a port, a self-closing valve comprising a tube leading from said port, and a plurality of overlapping strips secured to said receptacle and extending over the port, said tube being bent at a sharp angle about an edge of the innermost strip to collapse the tube.

10. In combination with an inflatable receptacle provided with a port, a self-closing valve comprising a tube leading from said port, a plurality of overlapping strips secured to said receptacle and extending over the port from opposite sides thereof, said tube being bent at a sharp angle about an edge of one of the strips to collapse the tube, and a cord extending from the free edge of the innermost strip whereby the strips may be elevated to release the tube.

In testimony whereof I have signed my name to this specification.

OSCAR A. YOUNGREN.